United States Patent [19]
Nishimoto et al.

[11] Patent Number: 4,597,019
[45] Date of Patent: Jun. 24, 1986

[54] CLOCK PULSE GENERATING CIRCUIT IN A COLOR VIDEO SIGNAL REPRODUCING APPARATUS

[75] Inventors: Naomichi Nishimoto, Tachikawa; Yutaka Ichinoi, Yokohama, both of Japan

[73] Assignee: Victor Company of Japan, Ltd., Yokohama, Japan

[21] Appl. No.: 590,783

[22] Filed: Mar. 19, 1984

[30] Foreign Application Priority Data

Mar. 22, 1983 [JP] Japan .................................. 58-47659

[51] Int. Cl.$^4$ .......................... H04N 5/92; H04N 5/95
[52] U.S. Cl. .................................... 358/320; 360/9.1;
360/23; 360/36.2; 358/310; 358/330
[58] Field of Search ............... 360/9.1, 23, 36.2, 36.1,
360/32; 358/310, 330, 12, 14, 319, 320, 325,
148, 150

[56] References Cited

U.S. PATENT DOCUMENTS 3,781,463 12/1973 Bussche .............................. 358/310
4,245,235 1/1981 Poetsch .............................. 358/14
4,335,393 6/1982 Pearson .............................. 358/11

Primary Examiner—Alan Faber
Attorney, Agent, or Firm—Roberts, Spiecens & Cohen

[57] ABSTRACT

A clock pulse generating circuit in a color video signal reproducing apparatus comprises a first PLL supplied with a horizontal synchronizing signal within a time-division-multiplexed signal reproduced from a recording medium and having a response characteristic such that the first PLL can sufficiently follow a time base deviation in the horizontal synchronizing signal, a second PLL supplied with the horizontal synchronizing signal and having a response characteristic such that the second PLL substantially does not follow a time base deviation or noise in the horizontal synchronizing signal, a circuit for resetting a variable frequency oscillator within the first PLL by a reset signal, where the reset signal is obtained by tapping a signal which is subjected to a phase comparison with the horizontal synchronizing signal in a phase comparator within the second PLL, and a switching circuit for producing a write-in clock pulse from a pulse which is obtained from the first PLL during a write-in operation of memory circuits within first and second time base expanding circuit of the reproducing apparatus and for producing a read-out clock pulse from a pulse which is obtained from the second PLL during a read-out operation of the memory circuits within the first and second time base expanding circuit.

6 Claims, 23 Drawing Figures

CLOCK PULSE GENERATING CIRCUIT IN A COLOR VIDEO SIGNAL REPRODUCING APPARATUS

BACKGROUND OF THE INVENTION

The present invention generally relates to clock pulse generating circuits in color video signal reproducing apparatuses for reproducing a recorded signal from a recording medium which has been recorded with a time-division-multiplexed signal which is obtained by independently subjecting a luminance signal and a line-sequential color difference signal of a color video signal to a time base compression and then time-division-multiplexing the time base compressed luminance signal and the time base compressed line-sequential color difference signal, which clock pulse generating circuits supply clock pulses to first and second time base expanding circuits which subject the reproduced time base compressed luminance signal and the reproduced time base compressed line-sequential color difference signal within the reproduced time base compressed time-division-multiplexed signal to a time base expansion so as to expand and return the time base to the original time base. More particularly, the present invention relates to a clock pulse generating circuit which employs two phase locked loops, and expands the time base, and at the same time, substantially eliminates a time base deviation (jitter) in the reproduced time-division-multiplexed signal.

Among the existing color video signal recording and reproducing apparatuses such as video tape recorders (VTRs) the more popular recording and reproducing apparatuses separate a luminance signal and a carrier chrominance signal from a standard system composite color video signal. The standard system is a system such as the NTSC system, the PAL system, and the SECAM system. The separated luminance signal is frequency-modulated, and the separated carrier chrominance signal is frequency-converted into a low frequency range. The frequency converted carrier chrominance signal is frequency-division-multiplexed with the frequency modulated luminance signal and recorded on a recording medium. At the time of the reproduction, a signal processing opposite to the signal processing carried out at the time of the recording, is carried out to obtain a reproduced composite color video signal which is in conformance with the original standard system. In other words, the more popular recording and reproducing apparatuses employ the so-called low-band-conversion recording and reproducing system.

Other various recording and reproducing systems have been proposed besides the low-band-conversion recording and reproducing system. For example, there was a proposed recording and reproducing apparatus which was designed to subject two kinds of color difference signals which are obtained by frequency-demodulating the carrier chrominance signal to a time base compression, and also subject the luminance signal to a time base compression. According to this proposed recording and reproducing apparatus, the time base compressed signals are time-division-multiplexed, and the time division multiplexed signal is frequency-modulated and recorded on the recording medium. At the time of the reproduction, a signal processing opposite to the signal processing carried out at the time of the recording, is carried out to obtain a reproduced composite color video signal which is in conformance with the original standard system. An example of such a recording and reproducing apparatus may be found in the U.S. Pat. Nos. 3,781,463 and 4,245,235, for example. This proposed recording and reproducing apparatus takes into account the difference in the bands of the luminance signal and the color difference signals, and takes measures so that the color difference signals having the narrower band can be transmitted within the horizontal blanking period. In other words, one of the color difference signals which is transmitted within one horizontal scanning period (1H), is subjected to a time base compression into approximately 20% of 1H. In addition, to utilize the band effectively, the luminance signal is subjected to a time base compression into approximately 80% of 1H so as to occupy a band which is in the same range as the band of the time base compressed color difference signal, and transmitted. Further, the two color difference signals are time-division-multiplexed, as a line-sequential signal in which the two color difference signals are alternately transmitted for every 1H, with the time base compressed luminance signal. This time-division-multiplexed signal is supplied to a frequency modulator, and an output signal of the frequency modulator is recorded on the recording medium. At the time of the reproduction, a signal processing opposite to the signal processing carried out at the time of the recording, is carried out to obtain a reproduced composite color video signal. The recording and reproducing system employed in this proposed recording and reproducing apparatus, will hereinafter be referred to as a timeplex system.

According to the timeplex system which transmits the time-division-multiplexed signal, there is no duration in which the luminance signal and the color difference signal are transmitted simultaneously. In the case of the NTSC system color video signal and the PAL system color video signal, a mutual interference and moire may occur between the luminance signal and the color difference signals, because the luminance signal and the carrier chrominance signal are band-share-multiplexed and transmitted. However, such a mutual interference and moire will not occur according to the timeplex system. In addition, even when the color video signal of any one of the NTSC system, the PAL system, and the SECAM system is recorded by an azimuth recording and reproducing system on tracks having the horizontal synchronizing signals recorded in non-alignment between mutually adjacent tracks and then reproduced, there is substantially no crosstalk from the adjacent tracks due to the azimuth loss effect, and it is possible to obtain a reproduced picture of a high picture quality. This is because the time-division-multiplexed signal is recorded on the adjacent tracks in the form of a frequency modulated signal which is obtained by frequency-modulating by the time-division-multiplexed signal a high-frequency carrier which has a large azimuth loss effect.

The time base compressed luminance signal and the time base compressed color difference signal employed in the timeplex system, both have an energy distribution in which the energy is large in the low frequency range and the energy is small in the high frequency range. In other words, the time base compressed luminance signal and the time base compressed color difference signal assume a signal format which is suited for the frequency modulation. Thus, it is possible to obtain a large modulation index, and the signal-to-noise ratio can be greatly improved. Moreover, it is possible to substantially eliminate a time base deviation in the reproduced signal when expanding the time base.

In the recording and reproducing apparatus which employs the timeplex system, a clock pulse generating circuit is provided within a control pulse generating device. This clock pulse generating circuit generates clock pulses which are in phase with the horizontal synchronizing signal. Normally, the clock pulse generating circuit is constituted from a single phase locked loop (PLL).

However, the reproduced horizontal synchronizing signal which is supplied to the clock pulse generating circuit at the time of the reproduction, includes a time base deviation (hereinafter simply referred to as a jitter). This jitter is caused by a deviation in the relative linear speed between the recording medium such as a magnetic tape and a reproducing scanning element such as a reproducing head, for example. Accordingly, the response characteristic of the PLL which constitutes the pulse generating circuit, was conventionally selected to have a fast response up to the high frequency range so that the PLL can sufficiently follow the jitter. The reproduced horizontal synchronizing signal sometimes included noise besides the jitter. This noise is in the high frequency range. Thus in a case where the reproduced horizontal synchronizing signal includes the noise besides the jitter, the PLL of the conventional pulse generating circuit also responds to the noise and carries out an erroneous operation. In this case, the time base expansion of the signal is started from a position which is different from the position where the time base compression originally starts. As a result, due to reasons such as the different time base expansion rates with which the time base compressed luminance signal and the time base compressed line-sequential color difference signal are expanded, a deviation occurs in the reproduced picture between the luminance signal and the color difference signals. In other words, there is a problem in that a color deviation occurs in the reproduced picture around the contours of the images in the picture.

SUMMARY OF THE INVENTION

Accordingly, it is a general object of the present invention to provide a novel and useful clock pulse generating circuit in a color video signal reproducing apparatus, in which the problems described heretofore have been eliminated.

Another and more specific object of the present invention is to provide a clock pulse generating circuit comprising a first phase locked loop which sufficiently follows a time base deviation in a reproduced synchronizing signal within a time-division-multiplexed signal which is reproduced from a recording medium, and a second phase locked loop having a response characteristic such that the second phase locked loop substantially does not respond to the above time base deviation in the reproduced signal. The clock pulse generating circuit is designed to selectively supply a write-in pulse from the first phase locked loop and a read-out pulse from the second phase locked loop, to memory circuits which are used to expand and return the time base of a time base compressed luminance signal and a time base compressed line-sequential color difference signal within the reproduced time-division-multiplexed signal back to the original time base.

According to the circuit of the present invention, it is possible to read out from the memory circuits the reproduced luminance signal and the reproduced line-sequential color difference signal which have been time base expanded so as to return the time base to the original time base, so that the reproduced luminance signal and the reproduced line-sequential color difference signal include no time base deviation. In addition, the time base expansion can be started from a position which is the same as the position where the time base compression was originally started. As a result, it is possible to prevent a color deviation from occurring around the contours of the images in the reproduced picture.

Still another object of the present invention is to provide a clock pulse generating circuit in which a pulse which has the horizontal scanning frequency and is supplied to a phase comparator within the second phase locked loop from a counter within the second phase locked loop, is also supplied to a monostable multivibrator, and a delay quantity of the monostable multivibrator is controlled by an output signal of a loop filter within the second phase locked loop circuit. The clock pulse generating circuit is designed to reset a variable frequency oscillator within the first phase locked loop by an output signal of the monostable multivibrator, or to reset the variable frequency oscillator directly by the pulse which has the horizontal scanning frequency.

According to the circuit of the present invention, it is possible to reduce the undesirable effects of a large delay quantity of a loop filter within the second phase locked loop. Further, it is possible to produce a signal which has a predetermined frequency and is accurately in phase with the input reproduced horizontal synchronizing signal, from the variable frequency oscillator within the first phase locked loop.

Other objects and further features of the present invention will be apparent from the following detailed description when read in conjunction with the accompanying drawings.

DETAILED DESCRIPTION

Figure 1:
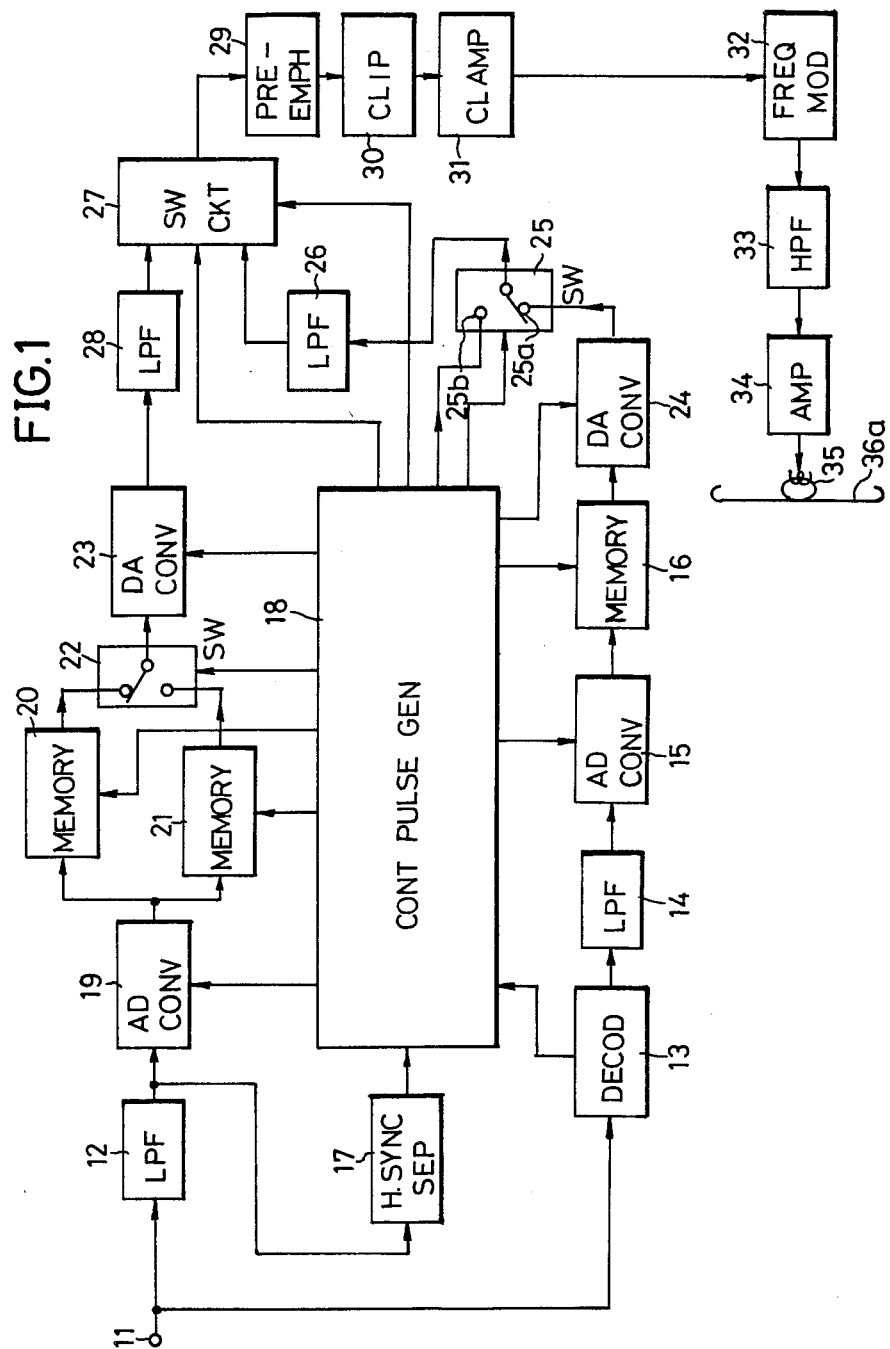
FIG. 1 is a systematic block diagram showing a recording system previously proposed by the present applicants, as an example of a recording system for recording a time-division-multiplexed signal based on the timeplex system.

Before describing the construction and operation of the clock pulse generating circuit according to the present invention, description will be given with respect to a recording system shown in FIG. 1. The recording system shown in FIG. 1 was previously proposed by the present applicants to record a time-division-multiplexed signal, and a video signal reproducing apparatus comprising a clock pulse generating circuit according to the present invention reproduces a time-division-multiplexed signal which has been recorded by such a recording system. In FIG. 1, a SECAM system color video signal shown in FIG. 2(A), for example, is applied to an input terminal 11. This color video signal is supplied to a lowpass filter 12 wherein a luminance signal is separated, and is also supplied to decoder 13 wherein a carrier chrominance signal is separated. The separated carrier chrominance signal is then demodulated into a line-sequential color difference signal.

Figure 2:
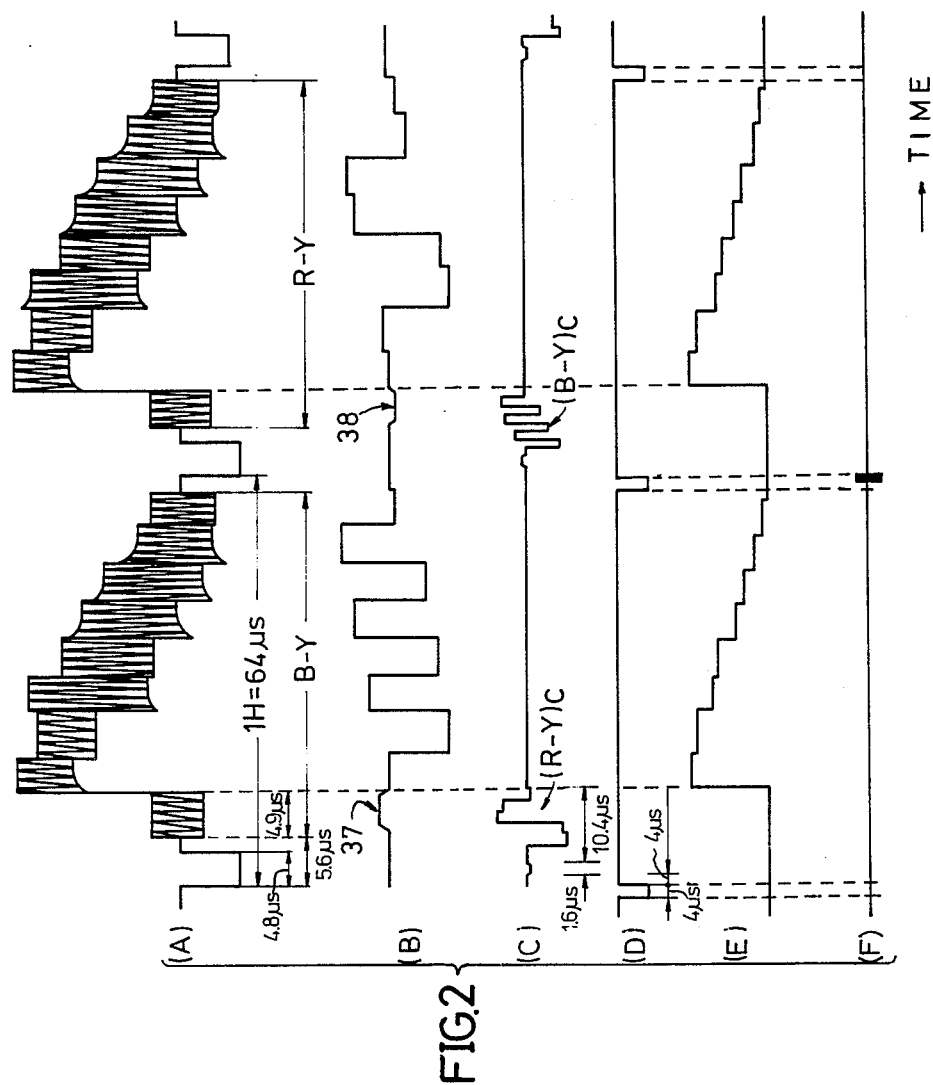
FIGS. 2(A) through 2(F) show signal waveforms for explaining the operation of the block system shown in FIG. 1.

In the line-sequential color difference signal, as shown in FIG. 2(B), there is a predetermined difference between a D.C. level 37 of an achromatic color part (non-modulated carrier part) having a width of 4.9 μs and located in a back porch within one horizontal scanning period (1H) in which a color difference signal (B−Y) is transmitted, and a D.C. level 38 of an achromatic color part (non-modulated carrier part) having a width of 4.9 μs and located in a back porch within 1H in which a color difference signal (R−Y) is transmitted. This is because a chrominance subcarrier frequency of the carrier chrominance signal is 4.25 MHz in the transmission line of the color difference signal (B−Y), and a chrominance subcarrier frequency of the carrier chrominance signal in the transmission line of the color difference signal (R−Y) is different from 4.25 MHz and is 4.406 MHz. The line-sequential color difference signal is subjected to a D.C. level shift, so that the D.C. level of the achromatic color part of one color difference signal coincides with the D.C. level of the achromatic color part of the other color difference signal, before being supplied to an analog-to- digital (AD) converter 15 through a lowpass filter 14. An output signal of the AD converter 15, is supplied to a memory circuit 16.

On the other hand, the luminance signal which is separated from the input SECAM system color video signal, is obtained from the lowpass filter 12. This luminance signal is supplied to a horizontal synchronizing signal separating circuit 17 wherein a horizontal synchronizing signal is separated. The separated horizontal synchronizing signal from the horizontal synchronizing signal separating circuit 17 is supplied to a control pulse generating device 18, together with a pulse which is obtained from a part of the decoder 13. The luminance signal from the lowpass filter 12 is also supplied to an AD converter 19 wherein the luminance signal is subjected to an analog-to-digital conversion. An output signal of the AD converter 19 is supplied to memory circuits 20 and 21. The memory circuits 16, 20, and 21 are each made up from a random access memory (RAM) and an address counter. The control pulse generating device 18 generates various control pulses, and supplies the control pulses to the AD converters 15 and 19, switching circuits 22, 25, and 27, and digital-to-analog (DA) converting circuits 23 and 24. In addition, the control pulse generating device 18 generates a write-in clock pulse and a read-out clock pulse with a predetermined timing and with a predetermined repetition frequency, and supplies these write-in and read-out clock pulses to the memory circuits 16, 20, and 21.

In other words, the control pulse generating device 18 supplies a write-in clock pulse of 8 MHz, for example, to one of the memory circuits 20 and 21, so as to write into the one of the memory circuits 20 and 21 a luminance signal which corresponds to a duration of 1H and is transmitted within a video duration of 52 μs. At the same time, the control pulse generating device 18 supplies a read-out clock pulse of 10 MHz, for example, to the other of the memory circuits 20 and 21 immediately after the transmission of a time base compressed color difference signal corresponding to 1H (52 μs) is completed, so as to read out from the other of the memory circuits 20 and 21 a stored luminance signal which corresponds to 1H and was transmitted 1H before. The read-out clock pulse is supplied to the other of the memory circuits 20 and 21 for a duration which excludes from the duration of 1H a serial transmission period in which the horizontal synchronizing signal and the time base compressed color difference signal are transmitted. The read-out operation and the write-in operation with respect to the memory circuits 20 and 21, are alternately carried out for every 1H. In addition the switching circuit 22 which is coupled to output sides of the memory circuits 20 and 21, is switched over in response to a control pulse from the control pulse generating device 18 so as to selectively pass an output signal of the memory circuit 20 or 21 which is carrying out the read-out operation. As a result, a luminance signal which has been time base compressed to 4/5, is intermittently obtained from the switching circuit 22 without a dropout of information. This time base compressed luminance signal from the switching circuit 22, is subjected to a digital-to-analog conversion in the DA converting circuit 23 and is converted into a signal shown in FIG. 2(E).

On the other hand, the line-sequential color difference signal is subjected to an analog-to-digital conversion in the AD converter 15 before being supplied to the memory circuit 16. The line-sequential color difference signal which is transmitted in a video duration of 52 μs within 1H (=64 μs), is written into the memory circuit 16 in response to a write-in clock pulse of 2 MHz, for example, which write-in clock pulse is received from the control pulse generating device 18. After a predetermined duration (1.6 μs, for example) from the time when this write-in operation is completed, a color difference signal which has been time base compressed to 1/5 is read out from the memory circuit 16 in response to a read-out clock pulse of 10 MHz, for example, which read-out clock pulse is received from the control pulse generating device 18. In this case, one read-out duration lasts for 10.4 μs.

The time base compressed line-sequential color difference signal from the memory circuit 16, is subjected to a digital-to-analog conversion in the DA converting circuit 24 before being supplied to a terminal 25a of the switching circuit 25. A D.C. level of the achromatic color part in the line-sequential color difference signal, which has been sampled and held in the control pulse generating device 18, is applied to a terminal 25b of the switching circuit 25. The switching of the switching circuit 25 is controlled by an output pulse of the control pulse generating device 18, so that the switching circuit 25 is switched over and connected to the terminal 25a immediately after the duration in which the D.C. level (color reference level) is applied to the terminal 25b ends. Thus, the switching circuit 25 selectively produces a signal shown in FIG. 2(C) in which the output time base compressed line-sequential color difference signal of the DA converting circuit 24 is time-division-multiplexed, immediately after the color reference level, and supplies this selectively produced signal to the switching circuit 27 through a lowpass filter 26. The DA converting circuits 23 and 24 each comprises a latch gate and a DA converter coupled thereto.

The switching circuit 27 is supplied with the time base compressed luminance signal shown in FIG. 2(E) from the DA converting circuit 23, through a lowpass filter 28. Further, the switching circuit 27 is also supplied with a multiplexed signal including a horizontal synchronizing signal having a width of approximately 4 μs as shown in FIG. 2(D) and a discriminating burst signal shown in FIG. 2(F) having a frequency of 1.6 MHz, for example. This multiplexed signal is generated in the control pulse generating device 18, from the horizontal synchronizing signal and the discriminating burst signal which are generated in the control pulse generating device 18. The discriminating burst signal is used to discriminate the color difference signals (B−Y) and (R−Y). In a case where a D.C. level difference between the achromatic color parts in the color difference signals (R−Y) and (B−Y) is eliminated by shifting the D.C. level of the achromatic color part in one of the color difference signals so as to coincide with the D.C. level of the achromatic color part in other of the color difference signals, and the recording and reproduction are carried out in this state where the D.C. level difference is eliminated, a discrimination must be performed to determine that a color difference signal which is obtained is either one of the two color difference signals in order to obtain the original carrier chrominance signal by use of a single frequency modulator in the reproducing system. In other words, the D.C. level difference between the achromatic color parts in the two color difference signals must be restored, before the original carrier chrominance signal can be obtained by the frequency modulator in the reproducing system.

Accordingly, in a case where the recording and reproduction are carried out with the above D.C. level difference maintained, the discriminating burst signal will not be required since the discriminating information which enables the discrimination between the two color difference signals is transmitted as the D.C. level difference.

The switching of the switching circuit 27 is controlled by a pulse from the control pulse generating device 18. Accordingly, the switching circuit 27 produces a time-division-multiplexed signal in which the multiplexed signal from the control pulse generating device 18, the output signal of the lowpass filter 26, and the output signal of the lowpass filter 28 are time-division-multiplexed in sequence within a duration of 1H. In other words, in a duration of a certain 1H, the output signal of the switching circuit 27 is a time-division-multiplexed signal including the horizontal synchronizing signal from the control pulse generating device 18, the output signal of the lowpass filter 26, and the output signal of the lowpass filter 28. On the other hand, in a duration of 1H which is immediately subsequent to the certain 1H, the output signal of the switching circuit 27 is a time-division-multiplexed signal including the multiplexed signal from the control pulse generating device 18, the output signal of the lowpass filter 26, and the output signal of the lowpass filter 28, where the horizontal synchronizing signal and the discriminating burst signal generated in the control pulse generating device 18 are multiplexed in the multiplexed signal from the control pulse generating device 18.

Figure 3:
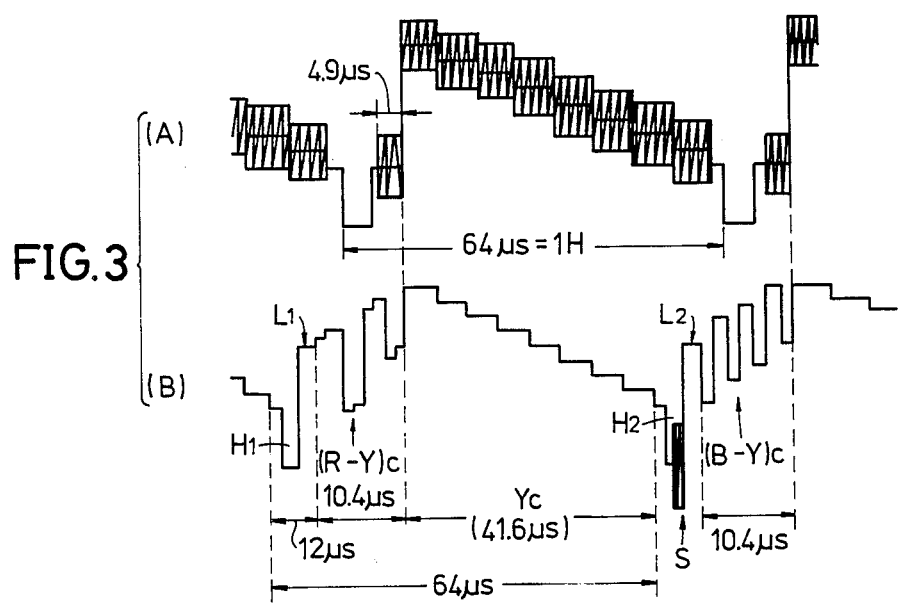
FIGS. 3(A) and 3(B) respectively show signal waveforms of an input color video signal to the block system shown in FIG. 1 and a time-division-multiplexed signal which is to be recorded by the block system shown in FIG. 1.

When a SECAM system color video signal in the form of a color bar signal shown in FIG. 3(A) is applied to the input terminal 11, a time-division-multiplexed signal shown in FIG. 3(B) is produced from the switching circuit 27. As shown in FIG. 3(B), a discriminating burst signal S is multiplexed with a horizontal synchronizing signal $H_2$ for every 1H (=64 μs). In the time-division-multiplexed signal shown in FIG. 3(B), horizontal synchronizing signals $H_1$ and $H_2$, color reference levels $L_1$ and $L_2$ (the D.C. level of the achromatic color part of the respective color difference signals), one of the time base compressed color difference signals $(R-Y)_C$ and $(B-Y)_C$, and a time base compressed luminance signal $Y_C$ are time-division-multiplexed, and the time base compressed color difference signal is transmitted line-sequentially. This time-division-multiplexed signal shown in FIG. 3(B) is passed through a known recording signal processing circuit comprising a pre-emphasis circuit 29, a white peak level clipping circuit 30, a clamping circuit 31, a frequency modulator 32, a highpass filter 33, and a recording amplifier 34. The output signal of the amplifier 34 is recorded on a magnetic tape 36a by a recording head 35.

Figure 4:
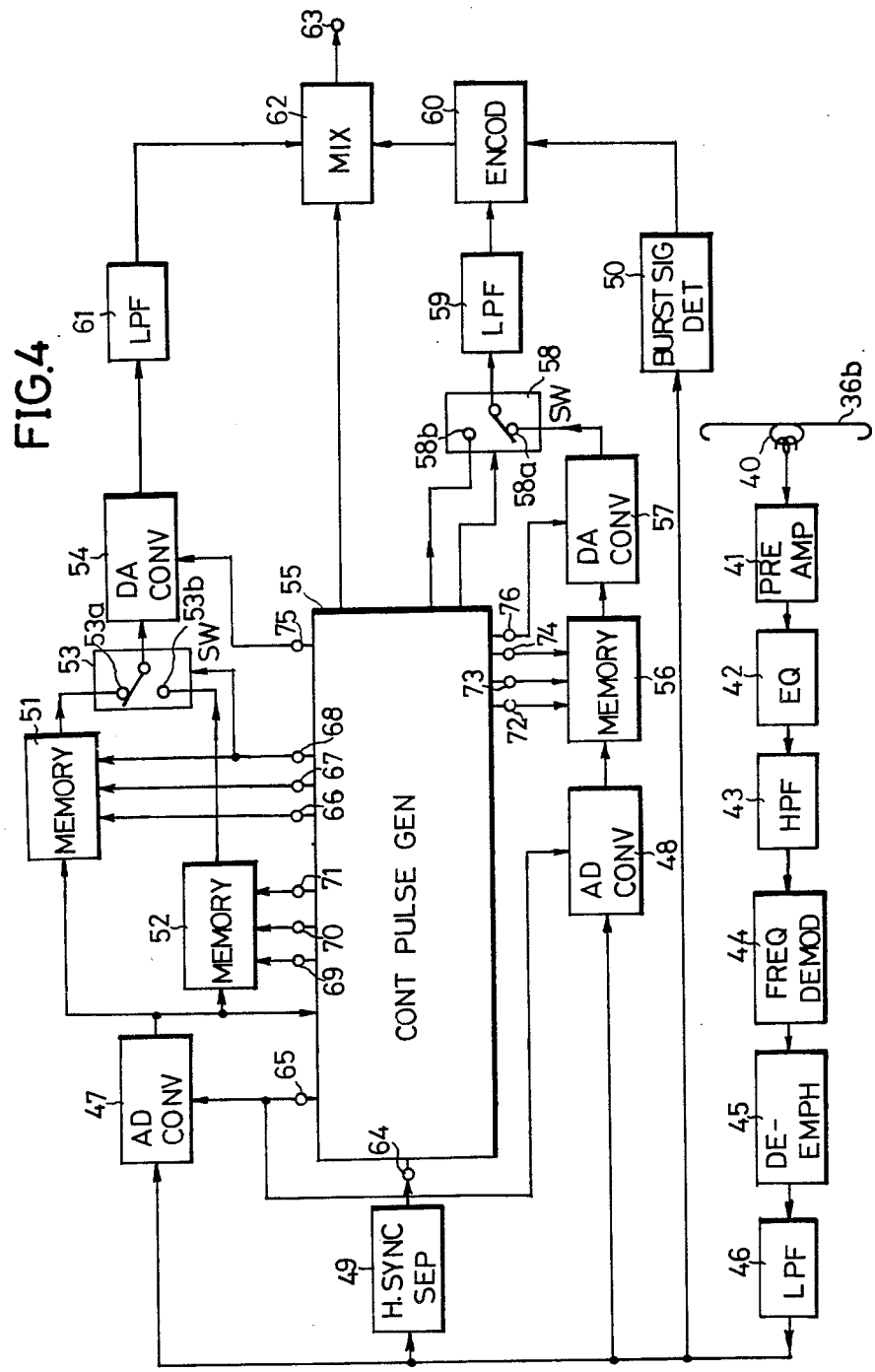
FIG. 4 is a systematic block diagram showing an embodiment of a color video signal reproducing apparatus comprising a clock pulse generating circuit according to the present invention.

The clock pulse generating circuit according to the present invention is provided within a control pulse generating device of a reproducing apparatus shown in FIG. 4. This reproducing apparatus shown in FIG. 4 reproduces a recorded signal from a recording medium which is recorded with the time-division-multiplexed signal described before which has been frequency modulated. Description will now be given with respect to the reproducing apparatus and the clock pulse generating circuit according to the present invention by referring to FIG. 4.

In FIG. 4, a magnetic tape 36b is recorded with the same time-division-multiplexed signal which has been frequency modulated and recorded on the magnetic tape 36a described previously. The recorded signal on the magnetic tape 36b is reproduced by a reproducing head 40. A reproduced frequency modulated signal from the reproducing head 40 is passed through a known reproduced signal processing circuit and is formed into a reproduced time-division-multiplexed signal shown in FIG. 3(B). This known reproduced signal processing circuit is made up from a preamplifier 41, an equalizer 42, a highpass filter 43, a frequency demodulator 44, and a de-emphasis circuit 45. The reproduced time-division-multiplexed signal from the de-emphasis circuit 45, is supplied through a lowpass filter 46, to AD converters 47 and 48, a horizontal synchronizing separating circuit 49, and a discriminating burst signal detector 50. The AD converter 47, memory circuits 51 and 52, a switching circuit 53, and a DA converting circuit 54 constitute a first time base expanding circuit for performing a time base expansion to 5/4. The DA converting circuit 54 produces a reproduced luminance signal in which the time base has been returned to the original time base. On the other hand, the AD converter 48, a memory circuit 56, and a DA converting circuit 57 constitute a second time base expanding circuit for performing a time base expansion to 5/1. The DA converting circuit 57 produces a reproduced line-sequential color difference signal in which the time base has been returned to the original time base.

The clock pulse generating circuit according to the present invention is internally built in a control pulse generating device 55. The clock pulse generating circuit generates clock pulses (including gate pulses) of predetermined frequencies through output terminals 65 through 76, based on a reproduced horizontal synchronizing signal which is supplied thereto from the horizontal synchronizing signal separating circuit 49 through an input terminal 64. Besides the clock pulses, the control pulse generating device 55 also generates a switching pulse for controlling the switching of a switching circuit 58, a horizontal synchronizing signal, and the like, based on the reproduced horizontal synchronizing signal which is obtained through the input terminal 64.

Figure 6:
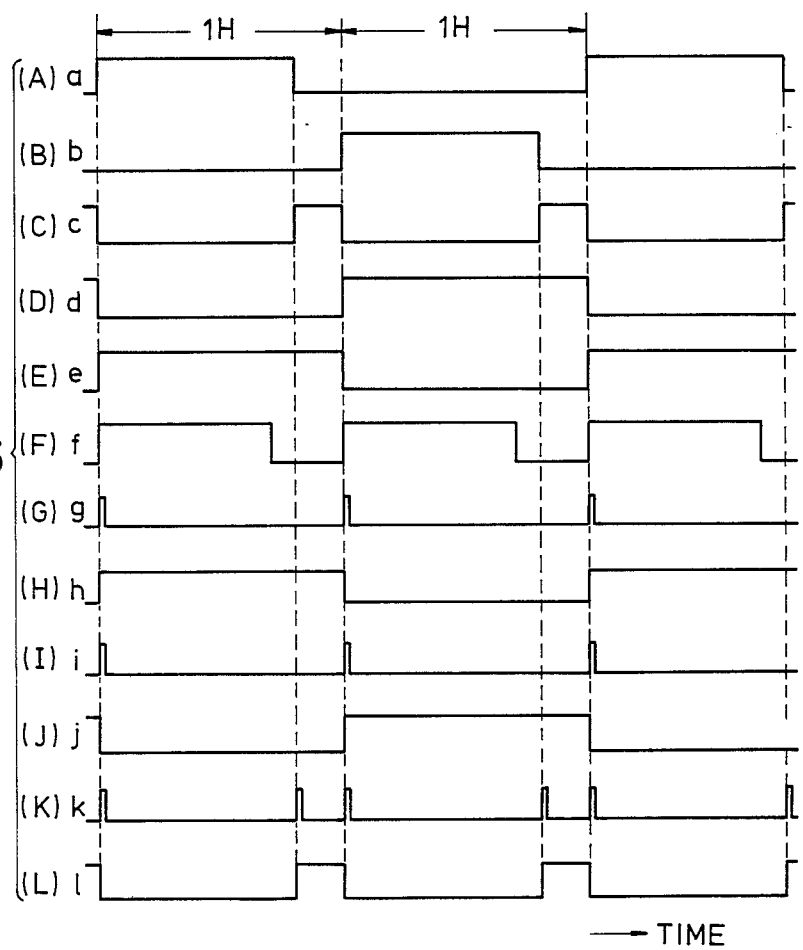
FIGS. 6(A) through 6(L) show signal waveforms for explaining the operation of the circuit system shown in FIG. 5.

The AD converters 47 and 48 subject the reproduced time-division-multiplexed signal to an analog-to-digital conversion, based on a clock pulse of 10 MHz, for example, which is obtained through the terminal 65. An output digital signal of the AD converter 47 is supplied to the memory circuits 51 and 52. The memory circuit 51 is supplied in parallel with a write-in or read-out clock pulse from the terminal 66, a write-in controlling gate pulse from the terminal 67, and a read-out controlling gate pulse from the terminal 68. The write-in and read-out controlling gate pulses will hereinafter be referred to as write-in and read-out control signals. On the other hand, the memory circuit 52 is supplied in parallel with a write-in or read-out clock pulse from the terminal 69, a write-in control signal from the terminal 70, and a read-out control signal from the terminal 71. The write-in control signals from the terminals 67 and 70, respectively are pulses a and b shown in FIGS. 6(A) and 6(B) which will be described later on in the specification. The pulses a and b have a period of 2H, where H represents one horizontal scanning period. The pulses a and b control the write-in operations of the respective memory circuits 51 and 52, so that the memory circuits 51 and 52 perform a write-in operation in a high-level duration of the respective pulses a and b. The read-out control signals from the terminals 68 and 71, respectively are pulses d and e shown in FIGS. 6(D) and 6(E) which will be described later on in the specification. The pulses d and e have a period of 2H, and control the read-out operations of the respective memory circuits 51 and 52 so that the memory circuits 51 and 52 perform a read-out operation in a high-level duration of the respective pulses d and e. Accordingly, the memory circuits 51 and 52 are controlled so as to repeat an operation in which the read-out operation and the write-in operation are alternately performed for every 1H, and so that one of the memory circuits 51 and 52 performs a read-out operation while the other of the memory circuits 51 and 52 performs a write-in operation.

For example, the memory circuits 51 and 52 are supplied with a write-in clock pulse of 10 MHz, and a read-out clock pulse of 8 MHz. The memory circuits 51 and 52 respectively perform a time base expansion to 5/4 responsive to the above write-in and read-out clock pulses, and a digital signal in which the time base has been returned to the original time base is read out from each of the memory circuits 51 and 52. The digital signal which is read out from the memory circuit 51 is supplied to a terminal 53a of the switching circuit 53, and the digital signal which is read out from the memory circuit 52 is supplied to a terminal 53b of the switching circuit 53. A clock pulse d shown in FIG. 6(D) which will be described later on in the specification, is supplied to the switching circuit 53 as a switching pulse from the terminal 68. This clock pulse d is a symmetrical square wave having a period of 2H. Thus, the switching circuit 53 alternately connects to the terminals 53a and 53b for every 1H, and selectively supplies to the DA converting circuit 54 the output digital signal of one of the memory circuit 51 and 52 which is performing the read-out operation.

The DA converting circuit 54 comprises a latch gate and a DA converter which is coupled to an output stage of the latch gate. A clock pulse of 8 MHz is supplied to the latch gate of the DA converting circuit 54, from the terminal 75. Hence, a digital signal which is latched in this latch gate responsive to the clock pulse from the terminal 75, is converted into an analog signal in the DA converter of the DA converting circuit 54. The write-in control signals from the terminals 67 and 70 are only generated in a duration in which the time base compressed luminance signal is transmitted. The write-in and read-out control signals from the terminals 67, 68, 70, and 71 are not generated in a duration in which the time base compressed line-sequential color difference signal is transmitted. Therefore, the memory circuits 51 and 52 do not perform the write-in and read-out of the time base compressed line-sequential color difference signal. As a result, only a reproduced luminance signal in which the time base has been returned to the original time base, is obtained from the DA converting circuit 54. This reproduced luminance signal is supplied to a mixing circuit 62 through a lowpass filter 61.

On the other hand, the digital signal which is obtained from the AD converter 48, is supplied to the memory circuit 56. The digital signal is written in the memory circuit 56 by a write-in clock pulse having a repetition frequency of 10 MHz, and is then read out from the memory circuit 56 by a read-out clock pulse having a repetition frequency of 2 MHz. Hence, a digital signal in which the time base has been expanded to 5/1, is obtained from the memory circuit 56 and is supplied to the DA converting circuit 57. The memory circuit 56 is supplied in parallel with a write-in or read-out clock pulse from the terminal 72, a write-in control signal from the terminal 73, and a read-out control signal from the terminal 74. The write-in control signal which is supplied to the memory circuit 56 from the terminal 73, is the pulse c shown in FIG. 6(C) which will be described later on in the specification. This pulse c assumes a high level only in the duration in which the time base compressed line-sequential color difference signal is transmitted, and the memory circuit 56 is controlled to perform a write-in operation this high-level duration of this pulse c. Accordingly, a reproduced line-sequential color difference signal in which the time base has been returned to the original time base, is obtained from the DA converting circuit 57 which is supplied with a clock pulse of 2 MHz from the terminal 76. The reproduced line-sequential color difference signal from the DA converting circuit 57, is supplied to a terminal 58a of the switching circuit 58.

A color reference level (indicated by $L_1$ and $L_2$ in FIG. 3(B)) which is obtained in the control pulse generating device 55 by sampling and holding, is applied to a terminal 58b of the switching circuit 58. The switching circuit 58 is connected to the terminal 58b for the duration of 10.4 μs in which the time base compressed color difference signal is transmitted, and is otherwise switched over and connected to the terminal 58a. As a result, the switching circuit 58 produces a reproduced line-sequential color difference signal in which the time base has been returned to the original time base and in which the D.C. level of the achromatic color part has been added. This reproduced line-sequential color difference signal from the switching circuit 58 is supplied to a first input terminal of an encoder 60, through a lowpass filter 59. The discriminating burst signal within the reproduced time-division-multiplexed signal described previously, is detected in the discriminating burst signal detector 50, and the output signal of the discriminating burst signal detector 50 is supplied to a second input terminal of the encoder 60.

The encoder 60 gives a predetermined D.C. level difference between the color difference signals (R−Y) and (B−Y) of the reproduced line-sequential color difference signal, before performing a frequency modulation to obtain a frequency modulated signal. Further, the encoder 60 transmits this frequency modulated signal only for a duration which excludes a predetermined duration of the frequency modulated signal. In other words, the encoder 60 transmits the frequency modulated signal for a duration which excludes the duration of the horizontal synchronizing signal, the durations in the vicinity of the horizontal synchronizing signal, and the like, to produce a frequency modulated signal which is a carrier chrominance signal in conformance with the SECAM system.

The reproduced carrier chrominance signal which is in conformance with the SECAM system and is obtained from an output terminal of the encoder 60, is supplied to the mixing circuit 62. This reproduced carrier chrominance signal, the reproduced luminance signal which is obtained from the DA converting circuit 54 through the lowpass filter 61, and synchronizing signals from the control pulse generating device 55, are respectively mixed in the mixing circuit 62. As a result, a reproduced color video signal in conformance with the SECAM system, is produced from the mixing circuit 62 through an output terminal 63.

Figure 5:
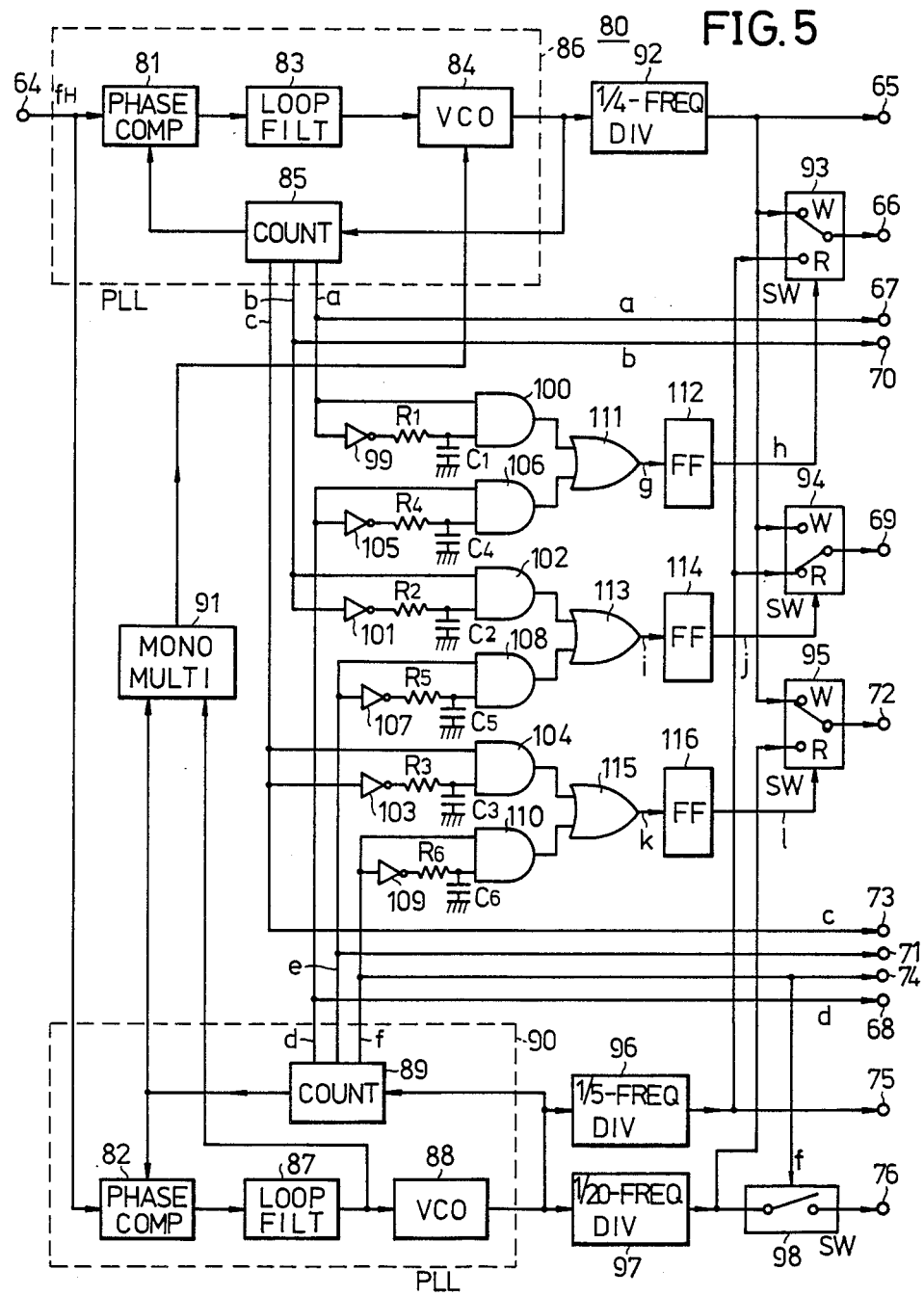
FIG. 5 is a systematic circuit diagram showing an embodiment of a clock pulse generating circuit according to the present invention.

The control pulse generating device 55 within the reproducing apparatus which carries out the reproducing operation described heretofore, comprises the clock pulse generating circuit according to the present invention. Description will now be given with respect to the clock pulse generating circuit according to the present invention by referring to FIGS. 5 and 6. In FIG. 5, those parts which are the same as those corresponding parts in FIG. 4 are designated by the same reference numerals. In a clock pulse generating circuit 80 shown in FIG. 5, the reproducing horizontal synchronizing signal obtained from the input terminal 64 and having a horizontal scanning frequency $f_H$, is supplied to phase comparators 81 and 82. A feedback loop comprising the phase comparator 81, a loop filter 83, a voltage controlled oscillator (VCO) 84, and a counter 85, constitute a first phase locked loop (PLL) 86. The response characteristic of this first PLL 86 is selected to that the first PLL 86 can sufficiently follow a time base deviation in the reproduced horizontal synchronizing signal of up to a range of 3 kHz, for example. Accordingly, the upper limit cutoff frequency of the loop filter 83 is selected to a relatively high frequency (for example, 5 kHz). The first PLL 86 may respond to noise included within the reproduced horizontal synchronizing signal, and may assume a state in which an output signal of the VCO 84 is not in phase with the reproduced horizontal synchronizing signal.

Thus, in the present embodiment of the invention, the clock pulse generating circuit 80 is provided with a second PLL 90 which is constituted from the phase comparator 82, a loop filter 87, a VCO 88, and a counter 89. By noting that the noise in the reproduced horizontal synchronizing signal is distributed in the high-frequency range the upper limit cutoff frequency of the loop filter 87 is selected to a low frequency (for example, several hundred Hz to several tens of Hz) so that the high-frequency noise can substantially be eliminated. Hence, the noise included in a phase error voltage from the phase comparator 82, is substantially eliminated in the loop filter 87 before being supplied to the VCO 88 to control the oscillation frequency of this VCO 88.

When the phases of the output pulses of the counters 85 and 89 in the first and second PLLs 86 and 90 lag the phase of the reproduced horizontal synchronizing signal, the levels of the phase error voltages obtained from the loop filters 83 and 87 become higher. Thus, the oscillation frequencies of the VCOs 84 and 88 are varied to frequencies which are higher than the respective frequencies at which the VCOs 84 and 88 oscillated up to that point, by the phase error voltages from the loop filters 83 and 87 which has assumed higher levels. On the other hand, when the phases of the output pulses of the counters 85 and 89 in the first and second PLLs 86 and 90 lead the phase of the reproduced horizontal synchronizing signal, the levels of the phase error voltages obtained from the loop filters 83 and 87 become lower. Hence, in this case, the oscillation frequencies of the VCOs 84 and 88 are varied to frequencies which are lower than the respective frequencies at which the VCOs 84 and 88 oscillated up to that point, by the phase error voltages from the loop filters 83 and 87 which has assumed lower levels. The center oscillation frequencies of the VCOs 84 and 88, are respectively selected to n times the reproduced horizontal synchronizing signal frequency $f_H$, where n is an arbitrary natural number. The counters 85 and 89 frequency-divide the respective output pulses of the VCOs 84 and 88 to 1/n, and supply the frequency divided signals to the phase comparators 81 and 82. In the present embodiment, it is assumed that n is equal to 2560, the horizontal scanning frequency $f_H$ is equal to 15.625 kHz, and that center oscillation frequencies of the VCOs 84 and 88 are respectively selected to 40 MHz. However, it should be noted that n may assume an arbitrary natural number, and that the PLLs 86 and 90 may be designed to produce pulses having an oscillation frequency of 80 MHz from the VCOs 84 and 88, for example.

Because the upper limit cutoff frequency of the loop filter 87 is selected to a low frequency as described before, the phase comparator 82 within the second PLL 90 produces a phase error voltage which is in accordance with an average phase of the reproduced horizontal synchronizing signal even in a case where the phase of the reproduced horizontal synchronizing signal is unstable due to noise. This phase error voltage which is in accordance with the average phase of the reproduced horizontal synchronizing signal, is applied to the VCO 88 as a control voltage, so that the VCO 88 produces a pulse which is in phase with the average phase of the reproduced horizontal synchronizing signal. In other words, the response characteristic of the second PLL 90 is selected so that the second PLL 90 sufficiently responds in the low frequency range, and substantially does not respond to the jitter and noise in the reproduced horizontal synchronizing signal. For this reason, the VCO 88 produces a pulse which has a stable phase and has a frequency which is n (2560 in this case) times the horizontal scanning frequency $f_H$.

The pulse which is obtained from the counter 89 within the second PLL 90 and has a frequency equal to the horizontal scanning frequency $f_H$, is applied to a monostable multivibrator 91 to trigger this monostable multivibrator 91. The monostable multivibrator 91 produces a pulse which has been delayed by a duration which is smaller than 1H. The output delayed pulse of the monostable multivibrator 91 is applied to the VCO 84 within the first PLL 86, as a reset pulse. For example, the VCO 84 is reset by a rising edge in the output delayed pulse of the monostable multivibrator 91, so that the output pulse of the VCO 84 rises at this reset point. Accordingly, even in a case where noise is included within the reproduced horizontal synchronizing signal, the VCO 84 produces a pulse which rises in phase with the rising edge in the reproduced horizontal synchronizing signal, for example, and has a repetition frequency of approximately 40 MHz, for example. This output pulse of the VCO 84 is supplied to a ¼-Frequency divider 92 as a clock pulse. The output pulse of the VCO 84 is also supplied to the counter 85 wherein the frequency of the pulse is frequency-divided into the horizontal scanning frequency, and an output of this counter 85 is supplied to the phase comparator 81. The response of the phase error voltage will become slow due to the loop filter 87, since the cutoff frequency of the loop filter 87 is selected to a low frequency for the purpose of eliminating the noise, and for this reason, the phase error between the two input signals to the phase comparator 82 will not be accurate. Therefore, the delay quantity of the monostable multivibrator 91 is controlled by the output signal of the loop filter 87, in order to reduce the undesirable effects of the large delay quantity of the loop filter 87.

In other words, in a case where the phase of the output pulse of the counter 89 lags the phase of the reproduced horizontal synchronizing signal, the output phase error voltage of the loop filter 87 becomes higher to control the time constant of the monostable multivibrator 91 to a small value. On the other hand, in a case where the output phase error voltage of the loop filter 87 becomes lower than a normal phase error voltage which is obtained in a normal state, the time constant of the monostable multivibrator 91 is controlled to a large value. Accordingly, the timing with which the VCO 84 is reset can be determined accurately, substantially without being affected by the large delay quantity of the loop filter 87. Known means may be employed as the means for varying the time constant of the monostable multivibrator 91, and for example, a transistor may be coupled instead of a resistor which determines the time constant. In this case, the output voltage of the loop filter 87 is applied to the base of the transistor to variably control the internal impedance of the transistor.

The output pulse of the VCO 84 is supplied to the output terminal 65 through the frequency divider 92. On the other hand, the output pulse of the VCO 84 is also supplied to respective terminals W of switching circuits 93, 94, and 95. The frequency of the output pulse of the VCO 88 is frequency-divided to 8 MHz in a 1/5-frequency divider 96, and an output signal of the frequency divider 96 is produced through the output terminal 75. Further, the output pulse of the VCO 88 is also supplied to respective terminals R of the switching circuits 93 and 94. At the same time, the output pulse of the VCO 88 is frequency-divided by 1/20 in a 1/20-frequency divider 97. An output signal of 2 MHz of the frequency divider 97, is supplied to a terminal R of the switching circuit 95 and to a switching circuit 98.

The counter 85 within the first PLL 86 counts the output pulse of the VCO 84, and produces the pulses a, b, and c shown in FIGS. 6(A), 6(B), and 6(C). The pulses a and b have a period of 2H, and the pulse c has a period of 1H. A high-level duration of the pulses a and b, corresponds to a duration in which the time base compressed luminance signal described previously is transmitted. A high-level duration of the pulse c corresponds to a duration of 10.4 μs in which the time base compressed line-sequential color difference signal described previously is transmitted. This high-level duration of the pulse c corresponds to a duration in which 416 output pulses of the VCO 84 is counted. The pulse a is supplied from the counter 85 to the memory circuit 51 as a write-in control signal, through the output terminal 67. Further, the pulse a is also supplied to a first rising edge detecting circuit which is made up from an inverter 99, a resistor R1, a capacitor C1, and an AND circuit 100. This first rising edge detecting circuit converts the pulse a into an edge detection pulse. This edge detection pulse rises with the rising edge of the pulse a, and falls after a delay time which is determined by an integrating circuit made up from the resistor R1 and the capacitor C1 and elapses from the rising edge of the pulse a. The above delay time of the integrating circuit is selected to an extremely small value. The pulse b is supplied from the counter 85 to the memory circuit 52 as a write-in control signal, through the output terminal 70. Moreover, the pulse b is also supplied to a second rising edge detecting circuit which is made up from an inverter 101, a resistor R2, a capacitor C2, and an AND circuit 102. This second rising edge detecting circuit detects the rising edge of the pulse b similarly as in the case of the first rising edge detecting circuit described above. The pulse c is supplied from the counter 85 to the memory circuit 56 as a read-out control signal, through the output terminal 73. The pulse c is also supplied to a third rising edge detecting circuit which is made up from an inverter 103, a resistor R3, a capacitor C3, and an AND circuit 104, and this third rising edge detecting circuit detects the rising edge of the pulse c similarly as in the case of the first rising edge detecting circuit described before.

On the other hand, the counter 89 within the second PLL 90 counts the output pulse of the VCO 88, and produces the pulses d, e, and f shown in FIGS. 6(D), 6(E), and 6(F). The pulses d and e are symmetrical square waves having a period of 2H, and these pulses d and e have mutually inverted phases. The pulse f has a period of 1H. The low-level duration of the pulse f is selected to correspond to a horizontal blanking period of the standard system color video signal such as the SECAM system color video signal. The rising edge of the pulse f coincides with the rising edge of the pulse d and with the trailing edge of the pulse e. The pulse d is produced through the output terminal 68 as a read-out control signal and as a switching pulse. The pulse d is also supplied to a fourth rising edge detecting circuit which is made up from an inverter 105, a resistor R4, a capacitor C4, and an AND circuit 106, and the fourth rising edge detecting circuit detects the rising edge of the pulse d similarly as in the case of the first rising edge detecting circuit described before. The switching circuit 53 described before, is connected to the terminal 53a in the high-level duration of the pulse d and is connected to the terminal 53b in the low-level duration of the pulse d. The pulse e is supplied to a fifth rising edge detecting circuit which is made up from an inverter 107, a resistor R5, a capacitor C5, and an AND circuit 108, and the pulse f is supplied to a sixth rising edge detecting circuit which is made up from an inverter 109, a resistor R6, a capacitor C6, and an AND circuit 110. The pulses e and f are also produced as read-out control signals through the respective output terminals 71 and 74.

The output edge detection pulses of the AND circuits 100 and 106 are converted into a pulse g shown in FIG. 6(G) in an OR circuit 111, and this pulse g is supplied to a flip-flop 112. An output signal of the flip-flop 112 is inverted with every rising edge of the pulse g, and the flip-flop 112 therefore produces a symmetrical square wave pulse h having a period of 2H as shown in FIG. 6(H). This pulse h is applied to the switching circuit 93 as a switching pulse. The switching circuit 93 is connected to the terminal W in the high-level duration of the pulse h, and is connected to the terminal R in the low-level duration of the pulse h. Hence, in the high-level duration of the pulse h, the switching circuit 93 selectively produces the 10 MHz clock pulse which is obtained from the output pulse of the first PLL 86 and is supplied to the terminal W thereof, and this 10 MHz clock pulse is supplied to the memory circuit 51 as a write-in clock pulse through the output terminal 66. On the other hand, in the low-level duration of the pulse h, the switching circuit 93 selectively produces the 8 MHz clock pulse which is obtained from the output pulse of the second PLL 90 and is supplied to the terminal R thereof, and this 8 MHz clock pulse is supplied to the memory circuit 51 as a read-out clock pulse through the output terminal 66.

The output edge detection pulses of the AND circuits 102 and 108 are converted into a pulse i shown in FIG. 6(I) in an OR circuit 113, and this pulse i is supplied to a flip-flop 114. The pulse i is frequency divided by ½ in the flip-flop 114, and is converted into a pulse j shown in FIG. 6(J). The pulse j and the pulse h described before, have mutually inverted phases. The rising edge of the pulse j coincides with the rising edge of the pulse b, and the trailing edge of the pulse j coincides with the rising edge of the pulse e. The pulse j is applied to the switching circuit 94 as a switching pulse. As a result, the switching circuit 94 is switched to selectively produce the 10 MHz clock pulse which is obtained from the frequency divider 92 and is supplied to the terminal W thereof, in the high-level duration of the pulse j. The switching circuit 94 selectively produces the 8 MHz clock pulse which is obtained from the frequency divider 96 and is supplied to the terminal R thereof, in the low-level duration of the pulse j.

The output pulse of the switching circuit 94 is supplied to the memory circuit 52 as a write-in or read-out clock pulse, through the output terminal 69. The memory circuit 52 is supplied with the pulse b from the terminal 70 as the write-in control signal, and writes therein the digital signal of the reproduced time-division-multiplexed signal, only in the high-level duration of the pulse b, based on the write-in clock pulse which is obtained from the switching circuit 94 through the terminal 69. Further, the memory circuit 52 is supplied with the pulse e from the terminal 71 as the read-out control signal, and reads therefrom the digital signal which has been written, only in the high-level duration of the pulse e, based on the read-out clock pulse which is obtained from the switching circuit 94 through the terminal 69. Accordingly, the memory circuit 52 is supplied with the 10 MHz write-in clock pulse which is obtained from the output pulse of the first PLL 86, during the write-in operation thereof. On the other hand, the memory circuit 52 is supplied with the 8 MHz read-out clock pulse which includes substantially no jitter and is obtained from the output pulse of the second PLL 90, during the read-out operation thereof.

The output edge detection pulses of the AND circuits 104 and 110 are converted into a pulse k shown in FIG. 6(K) in an OR circuit 115, and this pulse k is supplied to a flip-flop 116. The flip-flop 116 converts the pulse k into a pulse l shown in FIG. 6(L). The rising edge of the pulse l coincides with the rising edge of the pulse c, and the trailing edge of the pulse l coincides with the rising edge of the pulse f. The pulse l is applied to the switching circuit 95 as a switching pulse. The switching circuit 95 is switched to selectively produce the 10 MHz clock pulse which is obtained from the frequency divider 92 and is supplied to the terminal W thereof, in the high-level duration of the pulse l. On the other hand the switching circuit 95 is switched to selectively produce the 2 MHz clock pulse which is obtained from the frequency divider 97 and is supplied to the terminal R thereof, in the low-level duration of the pulse l.

The output pulse of the switching circuit 95, is supplied to the memory circuit 56 as a write-in or read-out clock pulse, through the output terminal 72. The memory circuit 56 is supplied with the pulse c from the terminal 73 as the write-in control signal, and writes therein the digital signal of the reproduced time-division-multiplexed signal, only in the high-level duration of the pulse c, based on the write-in clock pulse which is obtained from the switching circuit 95 through the terminal 72. Further, the memory circuit 56 is supplied with the pulse f from the terminal 74 as the write-in control signal, and reads therefrom the digital signal which has been written, only in the high-level duration of the pulse f, based on the read-out clock pulse which is obtained from the switching circuit 95 through the terminal 72.

Therefore, the memory circuit 56 is supplied with the 10 MHz write-in clock pulse which is obtained from the output pulse of the first PLL 86, during the write-in operation thereof. On the other hand, the memory circuit 56 is supplied with the 2 MHz read-out clock pulse which includes substantially no jitter and is obtained from the output pulse of the second PLL 90, during the read-out operation thereof. The pulse f is also applied to the switching circuit 98 as a switching pulse, and turns the switching circuit 98 ON only in the high-level duration of the pulse f. Thus, the 2 MHz clock pulse which is obtained from the frequency divider 97, is passed through the switching circuit 98 and is supplied to the DA converting circuit 57 through the output terminal 76, only in the high-level duration of the pulse f.

During the write-in operation, the memory circuits 51, 52, and 56 are supplied with the write-in clock pulses which are produced based on the output pulse of the VCO 84 within the first PLL 86 and include substantially the same jitter as the reproduced horizontal synchronizing signal which is applied to the input terminal 64. As a result, the digital signals of the reproduced time base compressed luminance signal and the reproduced time base compressed line-sequential color difference signal, are successively written without a time deviation. On the other hand, during the read-out operation, the memory circuits 51, 52, and 56 are supplied with the read-out clock pulses which are produced based on the output pulse of the VCO 88 within the second PLL 90 and include substantially no jitter. In other words, the memory circuits 51, 52, and 56 are supplied with stable write-in clock pulses which include substantially no jitter. The digital signal which have been written, are subjected to a time base expansion of a predetermined time base expansion rate, and are read out with the jitter substantially eliminated.

In a case where the delay quantity of the loop filter 89 is not considerably large, it is unnecessary to provide the monostable multivibrator 91. In this case, the output pulse of the counter 89 is directly applied to the reset terminal of the VCO 84, but the clock pulse will almost be unaffected by the noise. Hence, it is also possible in this case to produce from the VCO 84 a clock pulse which is in phase with the reproduced horizontal synchronizing signal.

The clock pulse generating circuit according to the present invention is applied to a case where a time-division-multiplexed signal of the timeplex system is to be reproduced, but the clock pulse generating circuit can of course be used in common at the time of the recording when the clock pulse generating circuit is applied to a recording and reproducing apparatus. In addition, a known pulse delay circuit may be used instead of the monostable multivibrator 91. Moreover, the clock pulse generating circuit according to the present invention may also be employed in a reproducing apparatus which is designed to reproduce a time-division-multiplexed signal of the NTSC or PAL system color video signal, which time-division-multiplexed signal is obtained based on the timeplex system.

Further, the present invention is not limited to these embodiments, but various variations and modifications may be made without departing from the scope of the present invention.

What is claimed is:

1. A clock pulse generating circuit in a color video signal reproducing apparatus, said reproducing apparatus comprising reproducing means for reproducing a recorded signal from a recording medium, said recording medium being recorded with a time-division-multiplexed signal which has been frequency modulated, said time-division-multiplexed signal having one of two kinds of time base compressed color difference signals which are alternately transmitted in line-sequence for each of a sequence of horizontal scanning periods, a time base compressed luminance signal and a horizontal synchronizing signal which are time-division-multiplexed within one horizontal scanning period demodulating means for demodulating a reproduced signal from said reproducing means and for obtaining a reproduced time-division-multiplexed signal, first time base expanding means for subjecting the reproduced time-division-multiplexed signal from said demodulating means to a time base expansion so as to obtain a reproduced luminance signal in which the time base has been returned to an original time base, second time base expanding means for subjecting the reproduced time-division-multiplexed signal from said demodulating means to a time base expansion so as to obtain a reproduced line-sequential color difference signal in which the time base has been returned to the original time base, and video signal producing means supplied with output signals of said first and second time base expanding means, for producing a reproduced color video signal, said clock pulse generating circuit comprising:

a first phase locked loop supplied with said horizontal synchronizing signal within said reproduced time-division-multiplexed signal, said first phase locked loop having a response characteristic of such a relatively high frequency that said first phase locked loop can sufficiently follow a time base deviation in said horizontal synchronizing signal, said first phase locked loop comprising a variable frequency oscillator which has a reset terminal;

a second phase locked loop supplied with said horizontal synchronizing signal within said reproduced time-division-multiplexed signal, said second phase locked loop having a response characteristic of such a relatively low frequency that said second phase locked loop substantially does not follow a temporary time base deviation or noise said horizontal synchronizing signal, said second phase locked loop comprising a phase comparator and a loop filter which is coupled to the output side of said phase comparator;

resetting means for resetting said variable frequency oscillator within said first phase locked loop by a reset signal, said resetting means comprising a pulse delay circuit for obtaining said reset signal by delaying a signal which is subjected to a phase comparison with said horizontal synchronizing signal in said phase comparator within said second phase locked loop and for supplying said reset signal to said reset terminal of said variable frequency oscillator within said first phase locked loop, said pulse delay circuit having a time constant which is variably controlled by an output signal of said loop filter within said second phase locked loop; and switching circuit means for producing a write-in clock pulse from a pulse which is obtained from said first phase locked loop during a write-in operation of two memory circuits within said first time base expanding means and a memory circuit within second time base expanding means, and for producing a read-out clock pulse from a pulse which is obtained from said second phase locked loop during a read-out operation of the two memory circuits within said first time base expanding means and the memory circuit within said second time base expanding means.

2. A clock pulse generating circuit as claimed in claim 1 in which said resetting means comprises a pulse delay circuit for obtaining the reset signal by delaying the signal which is subjected to the phase comparison with said horizontal synchronizing signal in the phase comparator within said second phase locked loop and for supplying the reset signal to a reset terminal of the variable frequency oscillator within said first phase locked loop, and said pulse delay circuit has a time constant which is variably controlled by an input signal of a variable frequency oscillator within said second phase locked loop.

3. A clock pulse generating circuit as claimed in claim 1 in which said switching circuit means comprises:

a first frequency divider for frequency-dividing an output pulse of the variable frequency oscillator within said first phase locked loop, and for producing a pulse which has a repetition frequency equal to a repetition frequency of said write-in clock pulse;

a first counter supplied with the input pulse to said first frequency divider, for producing first and second pulses, said first pulse having a pulse width corresponding to a duration in which said time base compressed luminance signal is transmitted, said second pulse having a pulse with corresponding to a duration in which said time base compressed line-sequential color difference signal is transmitted;

a second frequency divider for frequency-dividing an output pulse of a variable frequency oscillator within said second phase locked loop, and for producing a pulse which has a repetition frequency equal to a repetition frequency of the read-out clock pulse of the two memory circuits within said first time base expanding means;

a third frequency divider for frequency-dividing the output pulse of the variable frequency oscillator within said second phase locked loop, and for producing a pulse which has a repetition frequency equal to the repetition frequency of the read-out clock pulse of the memory circuit within said second time base expanding means;

a second counter supplied with the input signals to said second and third frequency dividers, for producing third and fourth pulses, said third pulse having a pulse with corresponding to a duration in which the reproduced luminance signal is transmitted, said fourth pulse having a rising edge which coincides with a rising edge of said third pulse and having a period of one horizontal scanning period;

two first output terminals for supplying said first pulse as a write-in control signal to the memory circuits within said first time base expanding means;

a second output terminal for supplying said second pulse as the write-in control signal to the memory circuit within said second time base expanding means;

two third output terminals for supplying said third pulse as a read-out control signal to the memory circuits within said first time base expanding means;

a fourth output terminal for supplying said fourth pulse as the read-out control signal to the memory circuit within said second time base expanding means;

a first switching pulse generating circuit supplied with said first and third pulses, for generating a first switching pulse;

a second switching pulse generating circuit supplied with said second and fourth pulses, for generating a second switching pulse;

a first switching circuit controlled in response to said first switching pulse, for selectively supplying to said first time base expanding means the output pulse of said first frequency divider as the write-in clock pulse and the output pulse of said second frequency divider as the read-out clock pulse; and a second switching circuit controlled in response to said second switching pulse, for selectively supplying to said second time base expanding means the output pulse of said first frequency divider as the write-in clock pulse and the output pulse of said third frequency divider as the read-out clock pulse.

4. A clock pulse generating circuit as claimed in claim 3 in which said first switching pulse generating circuit comprises a first detecting circuit for detecting a leading edge of said first and third pulses, and a first flip-flop for producing an inverted output in response to an output signal of said first detecting circuit, and said second switching pulse generating circuit comprises a second detecting circuit for detecting a leading edge of said second and fourth pulses, and a second flip-flop for producing an inverted output in response to an output signal of said second detecting circuit.

5. A clock pulse generating circuit as claimed in claim 3 in which said first pulse is two kinds of pulses having mutually inverted phases and having a period of two horizontal scanning periods, said third pulse is two kinds of symmetrical square waves having mutually inverted phases and having a period of two horizontal scanning periods, and said first switching circuit comprises two switching circuits for independently and selectively supplying a clock pulse to the two memory circuits within said first time base expanding means.

6. A clock pulse generating circuit as claimed in claim 1 in which said first and second time base expanding means each comprises an analog-to-digital converter for subjecting said reproduced time-division-multiplexed signal to an analog-to-digital conversion, digital memory circuit means into which an output digital signal of said analog-to-digital converter is written based on the write-in clock pulse and from which the written digital signal is read out based on the read-out clock pulse which has a frequency lower than the frequency of said write-in clock pulse, and a digital-to-analog converting circuit for converting an output digital signal of said digital memory circuit means into an analog signal, and said clock pulse generating circuit further comprises first clock pulse generating means for generating a clock pulse for said analog-to-digital converter from a pulse which is obtained from said first phase locked loop, and a second clock pulse generating circuit for generating a clock pulse for said digital-to-analog converting circuit from a pulse which is obtained from said second phase locked loop.

* * * * *